A. BLACKBURN.
ANIMAL ATTACHMENT.
APPLICATION FILED DEC. 27, 1907.
915,409.
Patented Mar. 16, 1909.
2 SHEETS—SHEET 1.
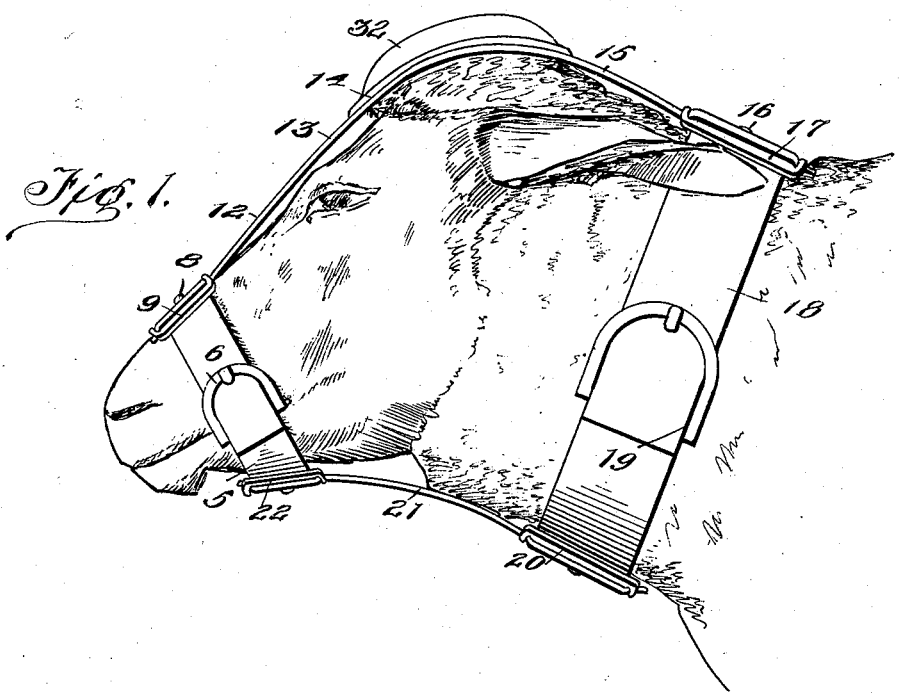
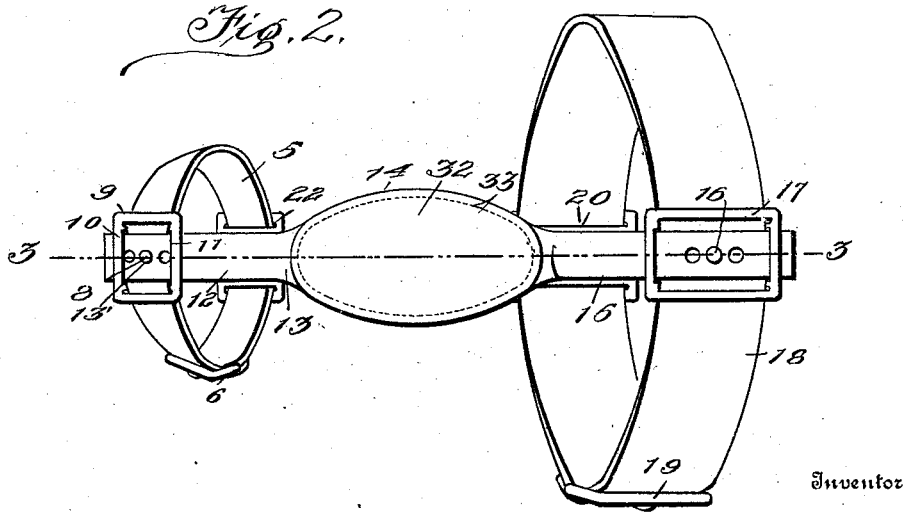
Witnesses
Inventor
Alvah Blackburn.
By Woodward & Chandlee
Attorneys A. BLACKBURN.
ANIMAL ATTACHMENT.
APPLICATION FILED DEC. 27, 1907.
915,409.
Patented Mar. 16, 1909.
2 SHEETS—SHEET 2.
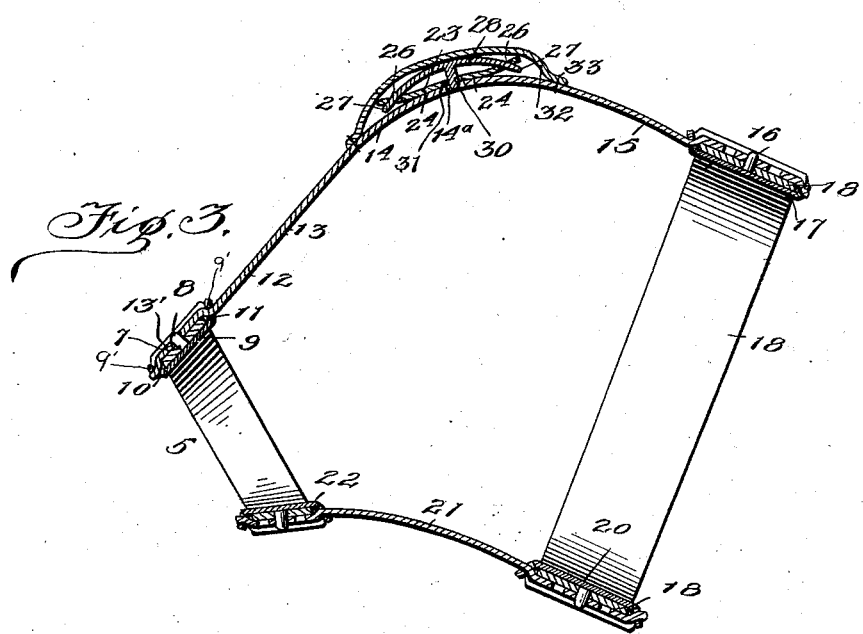
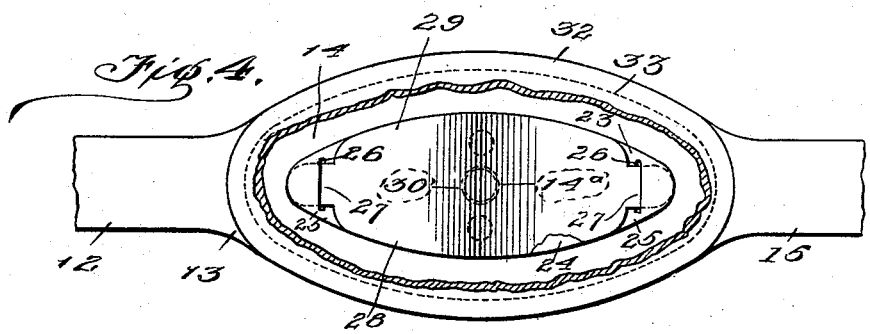
Witnesses
Geo X Ham
E L Chandlee
Inventor
Alvah Blackburn
By Woodward & Chandlee
Attorneys

UNITED STATES PATENT OFFICE.

ALVAH BLACKBURN, OF RYOT, PENNSYLVANIA.

ANIMAL ATTACHMENT.

No. 915,409.  Specification of Letters Patent.  Patented March 16, 1909.

Application filed December 27, 1907. Serial No. 408,240.

*To all whom it may concern:*

Be it known that I, ALVAH BLACKBURN, a citizen of the United States, residing at Ryot, in the county of Bedford and State of Pennsylvania, have invented certain new and useful Improvements in Animal Attachments, of which the following is a specification.

This invention relates to the care of livestock, and more particularly to a device adapted for attachment to sheep and like animals, and has for its object to provide a device which may be conveniently applied to the animal and which will effectively serve to break the animal of butting; means being provided whereby upon each offense sufficient pain will be inflicted upon the head of the animal, to cure the same of this habit.

Other objects and advantages will be apparent from the following description and it will be understood that changes in the specific structure shown and described may be made within the scope of the claims without departing from the spirit of the invention.

In the drawings forming a portion of this specification, and in which like characters of reference indicate similar parts in the several views, Figure 1 is a side elevational view of the present invention showing the same applied to the head of an animal. Fig. 2 is a top plan view. Fig. 3 is a vertical longitudinal sectional view on the line 3—3 of Fig. 2. Fig. 4 is a top plan view on a larger scale portions being broken away to disclose the spring.

Referring now more particularly to the drawings, there is shown a nose band 5 provided at its side with an adjusting buckle 6. The band 5 is provided at its top with an opening 7, and this opening is thus arranged to receive a vertically extending pin 8 which projects upwardly from a plate 9 which is engaged upon the band, as shown, the pin 8 extending through the band. The plate 9 is provided with upwardly turned ends 9' having transversely extending slots 10 and 11 respectively arranged at opposite sides of the band, and these slots are thus arranged to receive the reduced tongue 12 of a strap 13. The tongue 12 is provided with an opening 13' arranged to engage the pin 7. The strap 13 is provided with an enlarged portion 14 arranged to lie over the forehead of the animal, and at the inner end the strap 13 is provided with a tongue 15 similar to the tongue 12. The tongue 15 is arranged for engagement with a pin 16 carried by a plate 17 similar to the plate 9 which is arranged upon a collar 18. The portion 14 of the strap 13 is provided with a centrally located passage 14$^a$.

The collar 18 is provided at one side with a buckle 19, and at the bottom the collar is provided with a plate 20 similar to the plates 9 and 17 respectively previously described. The plate 20 is arranged to receive a strap 21 which extends beneath the jaw of the animal, and at the forward end this strap is engaged with a sliding plate 22 carried by the strap 5 at the lower end thereof.

Riveted upon the portion 14 of the strap 13 there is shown a flat leaf spring 23 having an enlarged main portion 24 and reduced ends 25. The spring adjacent its ends 25 is slitted as shown at 26, and arranged in these slits there are shown reduced end portions 27 of an arcuate leaf spring 28 having a portion 29 similar to the portion 24 of the spring 23. The spring 28 is provided with a depending pin 30, and this pin is disposed with a portion in a passage 31 formed in the spring 23, being thus arranged to extend at times inwardly of the passage 14$^a$. A strap 32 is arranged to house the springs, and this strap is sewed at its edges to the edges of the strap 14, as shown at 33.

It will thus be seen that upon pressure upon the springs the pin 31 will be forced through the passages 14$^a$ and 31 respectively and prick the head of the animal.

What is claimed is:

1. In a device of the class described, the combination with attaching straps, of a spring secured upon one of the straps, said spring and strap having registering openings therethrough, said spring having transverse slits adjacent to its ends, an arcuate spring having end portions engaged in said slits of the first named spring, and a pin carried by the arcuate spring and engaged in the openings of the first named spring and strap for movement therethrough.

2. In a device of the class described, the combination with a forehead strap, of a leaf spring secured to said strap, said strap and spring having registering passages formed therethrough, said spring having parallel slits at opposite sides of the opening, a second spring having end portions engaged in the slits, a pin carried by the second spring and engaged through the registering openings of the first spring and forehead strap, and a strap secured to the forehead strap and inclosing the springs.

In testimony whereof I affix my signature, in presence of two witnesses.

ALVAH BLACKBURN.

Witnesses:
E. R. C. BLACKBURN,
W. A. McGREGOR.